US012593175B2

(12) United States Patent
Irii et al.

(10) Patent No.: US 12,593,175 B2
(45) Date of Patent: Mar. 31, 2026

(54) ELECTRO-ACOUSTIC TRANSDUCER

(71) Applicant: Audio-Technica Corporation, Tokyo (JP)

(72) Inventors: Koichi Irii, Tokyo (JP); Hiroshi Akino, Tokyo (JP)

(73) Assignee: Audio-Technica Corporation, Tokyo (JP)

( * ) Notice: Subject to any disclaimer, the term of this patent is extended or adjusted under 35 U.S.C. 154(b) by 151 days.

(21) Appl. No.: 18/672,707

(22) Filed: May 23, 2024

(65) Prior Publication Data

US 2024/0388850 A1 Nov. 21, 2024

Related U.S. Application Data

(63) Continuation of application No. PCT/JP2022/033774, filed on Sep. 8, 2022.

(30) Foreign Application Priority Data

Dec. 8, 2021 (JP) ................................ 2021-199185

(51) Int. Cl.
*H04R 7/04* (2006.01)
*H04R 7/16* (2006.01)

(52) U.S. Cl.
CPC ................. *H04R 7/04* (2013.01); *H04R 7/16* (2013.01); *H04R 2201/02* (2013.01)

(58) Field of Classification Search
CPC ......... H04R 2201/02; H04R 7/16; H04R 7/04
USPC .......................................................... 381/150
See application file for complete search history.

(56) References Cited

U.S. PATENT DOCUMENTS

2014/0321675 A1* 10/2014 Nakano .................. H04R 19/02 381/162
2015/0071468 A1* 3/2015 Chiang ................ H04R 19/005 381/191
2017/0064421 A1 3/2017 Matsumura et al.
2017/0289667 A1 10/2017 Okita
2020/0196047 A1 6/2020 Irii et al.

FOREIGN PATENT DOCUMENTS

CN 201726530 U 1/2011
JP 2013-026746 A 2/2013
JP 2017-050844 A 3/2017
JP 2017-183851 A 10/2017
JP 2020-098957 A 6/2020
WO 2016/171250 A1 10/2016

* cited by examiner

*Primary Examiner* — Sean H Nguyen
(74) *Attorney, Agent, or Firm* — WCF IP

(57) ABSTRACT

An electro-acoustic transducer includes: a housing, a partition member disposed inside the housing, a first electro-acoustic conversion unit, and a second electro-acoustic conversion unit. The first electro-acoustic conversion unit includes a fixed electrode, a vibrating membrane, and a support member that supports a partial region of the vibrating membrane and brings a part of the vibrating membrane in contact with the fixed electrode. The first electro-acoustic conversion unit and the second electro-acoustic conversion unit are disposed facing each other across the partition member so that a sound emitting part and a sound emitting part communicate with an acoustic outlet, and the partition member supports the support member and the support member.

9 Claims, 10 Drawing Sheets

ELECTRO-ACOUSTIC TRANSDUCER

CROSS-REFERENCE TO RELATED APPLICATIONS

The present application is a continuation application of International Application number PCT/JP2022/33774, filed on Sep. 8, 2022, which claims priority under 35 U.S.C § 119 (a) to Japanese Patent Application No. 2021-199185, filed on Dec. 8, 2021. The contents of these applications are incorporated herein by reference in their entirety.

BACKGROUND OF THE INVENTION

The present invention relates to an electro-acoustic transducer that converts an electrical signal into sound.

Conventionally, an electrostatic electro-acoustic transducer having a flat plate-shaped fixed electrode (hereinafter referred to as a fixed electrode) and a vibrating membrane provided to face the fixed electrode is known. Japanese Unexamined Patent Application Publication No. 2017-183851 discloses a condenser type of earphone in which an outer peripheral part of a thin-film vibrating membrane is fixed to a housing.

In the electro-acoustic transducer such as the condenser type of earphone or headphone, pressure inside the electro-acoustic transducer changes as pressure inside an ear canal changes depending on a wearing state of the electro-acoustic transducer. If the pressure inside the electro-acoustic transducer changes while the vibrating membrane is fixed to a housing only at the outer peripheral part of the vibrating membrane, stress is concentrated on the outer peripheral part of the vibrating membrane due to displacement of the vibrating membrane. In the electro-acoustic transducer, it is desirable that the structure is such that the vibration membrane is less likely to be damaged due to stress applied to the outer peripheral part of the vibration membrane and that sensitivity (sound pressure) of the electro-acoustic transducer can be improved even when the electro-acoustic transducer is small.

BRIEF SUMMARY OF THE INVENTION

The present invention focuses on this point, and its object is to provide an electro-acoustic transducer in which a vibrating membrane is difficult to be damaged and a decrease in sensitivity of the electro-acoustic transducer is less likely to be caused even when the electro-acoustic transducer is small.

An electro-acoustic transducer according to the present invention including: a housing that includes an acoustic outlet for emitting a sound to the outside; a partition member disposed inside the housing; a first electro-acoustic conversion unit disposed inside the housing; and a second electro-acoustic conversion unit disposed inside the housing, wherein the first electro-acoustic conversion unit and the second electro-acoustic conversion unit each include: a fixed electrode; a vibrating membrane which is disposed opposite to the fixed electrode and vibrates in accordance with a potential difference generated between the fixed electrode and the vibrating membrane, on the basis of an electrical signal; and a support member that supports a partial region of the vibrating membrane and brings a part of the vibrating membrane into contact with the fixed electrode, wherein a distance between the vibrating membrane and the fixed electrode in a thickness direction of the fixed electrode becomes longer as the distance from the partial region to an outer side increases, wherein the first electro-acoustic conversion unit and the second electro-acoustic conversion unit are disposed facing each other across the partition member so that a sound emitting part of the first electro-acoustic conversion unit and a sound emitting part of the second electro-acoustic conversion unit communicate with the acoustic outlet, and the partition member supports the support member of the first electro-acoustic conversion unit and the support member of the second electro-acoustic conversion unit.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

First Embodiment

Figure 1:
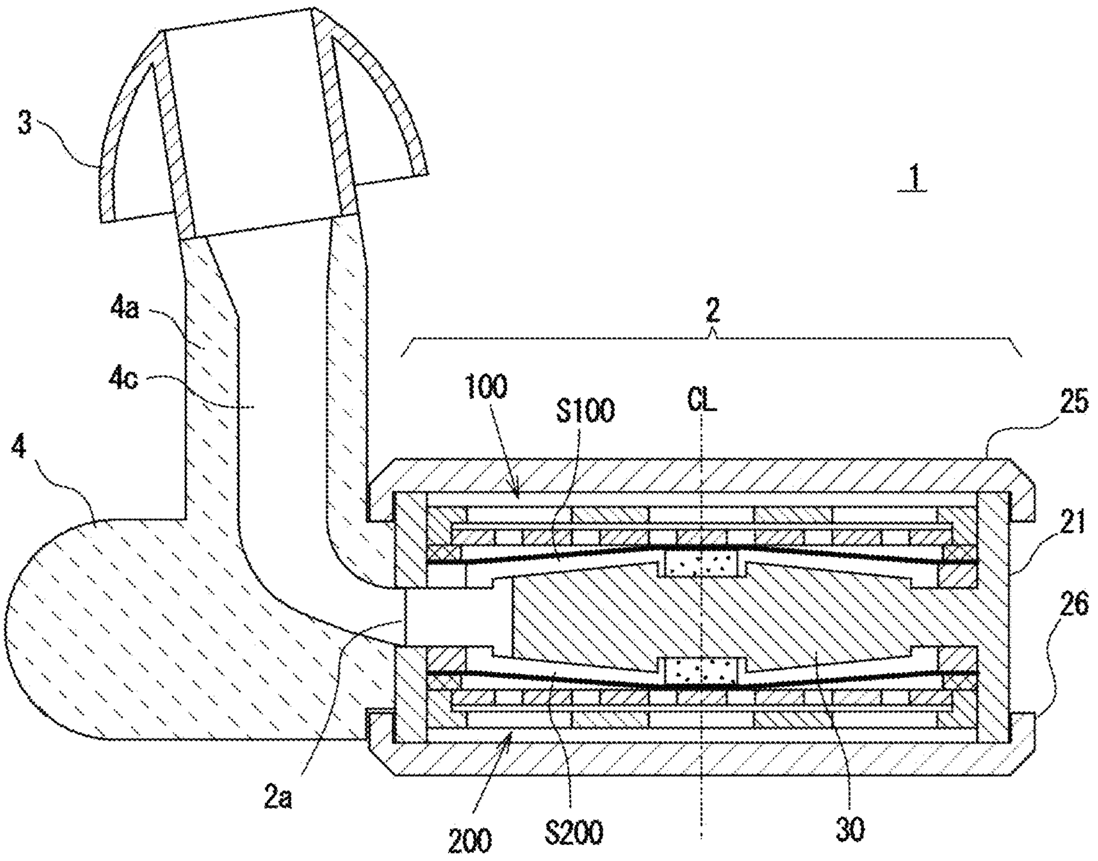
FIG. 1 is a cross-sectional view of an earphone as an example of an electro-acoustic conversion device.
Figure 2:
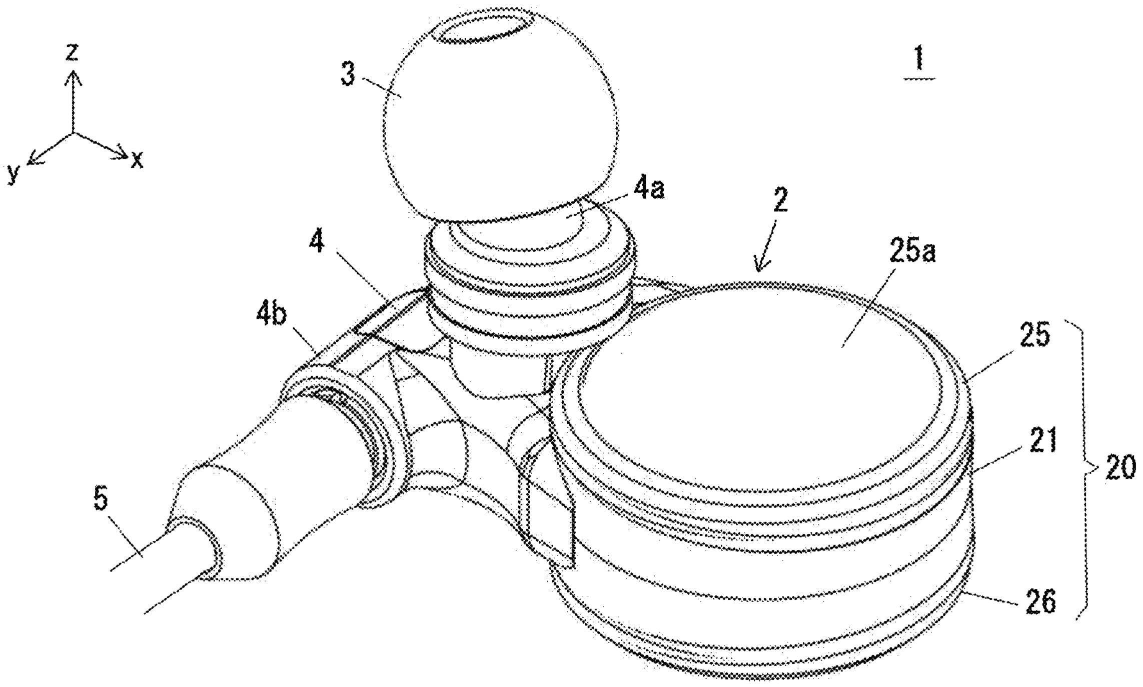
FIG. 2 shows the appearance of the earphone of FIG. 1.

An electro-acoustic transducer according to an embodiment of the present invention and an electro-acoustic conversion device including the electro-acoustic transducer will be described with reference to the drawings. FIG. 1 is a cross-sectional view of an earphone 1 as an example of the electro-acoustic conversion device. FIG. 2 is a view showing the appearance of the earphone 1 of FIG. 1.

Although the present invention can be applied to both the so-called canal type of earphone and inner ear type of earphone, the canal type of earphone will be exemplified below. The outer shape of the earphone 1 of FIG. 1 somewhat differs from the outer shape of the earphone 1 of FIG. 2, but these differences are not essential.

In the following description, terms that indicate directions such as "up", "down", "right" and "left" are used in accordance with the orientation of an object drawn in the drawings, but these terms are not intended to limit the present invention. The "up" and "down" direction corresponds to a thickness direction of the electro-acoustic transducer, and the "right" and "left" direction corresponds to a direction traversing the electro-acoustic transducer.

Outline of the Electro-Acoustic Conversion Device

As shown in FIGS. 1 and 2, the earphone 1 includes an electro-acoustic transducer 2, an earpiece 3, a conduit forming member 4, and a cable 5.

The electro-acoustic transducer 2 is a driver unit that converts an electrical signal into a sound. An internal structure of the electro-acoustic transducer 2 will be described in detail later. The earpiece 3 is a member to be inserted into the ear canal of a user, and is made of an elastic material.

The conduit forming member 4 forms a part of the outer shape of the earphone 1. The conduit forming member 4 includes a conduit part 4*a* and a cable connecting part 4*b*. The conduit part 4*a* is a cylindrical structural portion for emitting the sound generated by the electro-acoustic transducer 2 to the outside. A conduit line 4*c* is formed inside the conduit part 4*a*. The earpiece 3 is attached at a tip of the conduit part 4*a*.

The cable connecting part 4*b* is a portion to which the cable 5 is connected. The cable 5 transmits the electrical signal to the electro-acoustic transducer 2.

In the present embodiment, the conduit forming member 4 and the electro-acoustic transducer 2 are described as separate components, but this does not mean that the conduit forming member 4 and the electro-acoustic transducer 2 must be separately provided. The conduit forming member 4 and the electro-acoustic transducer 2 may be integrally provided by a single member.

Configuration of the Electro-Acoustic Transducer

Figure 3:
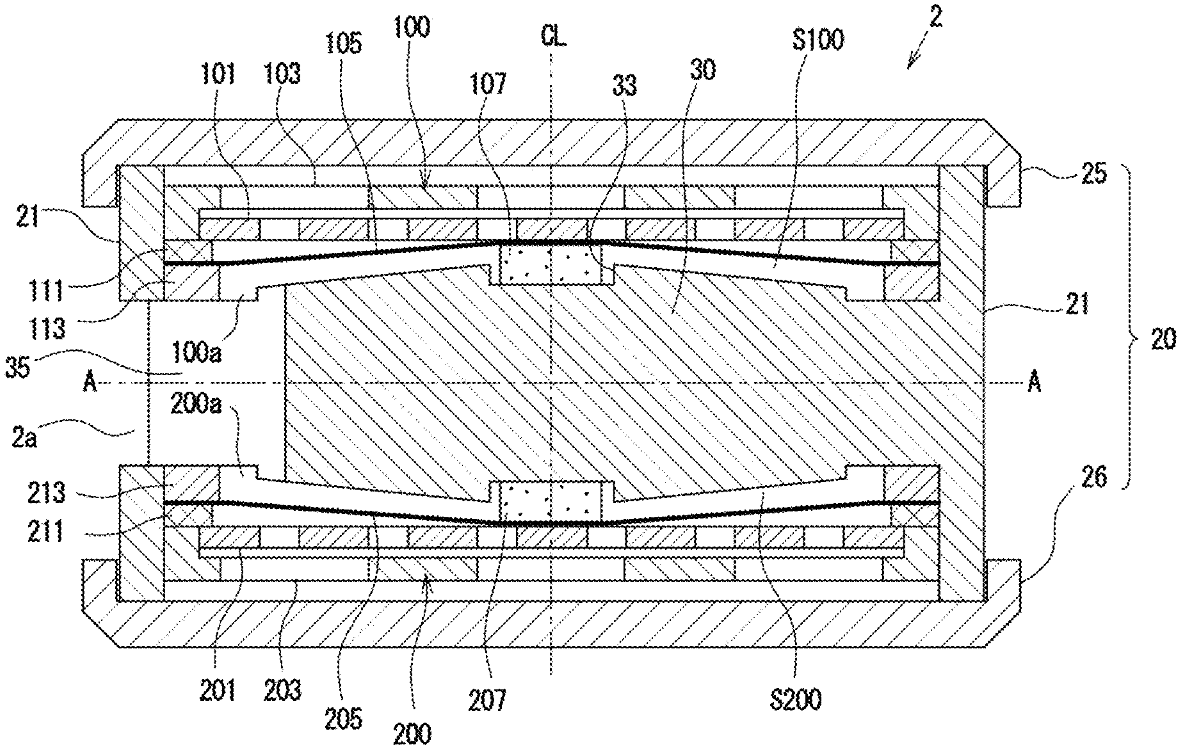
FIG. 3 is a cross-sectional view of the electro-acoustic transducer of the earphone of FIG. 1, showing the cross-sectional view in a thickness direction of a housing.
Figure 4:
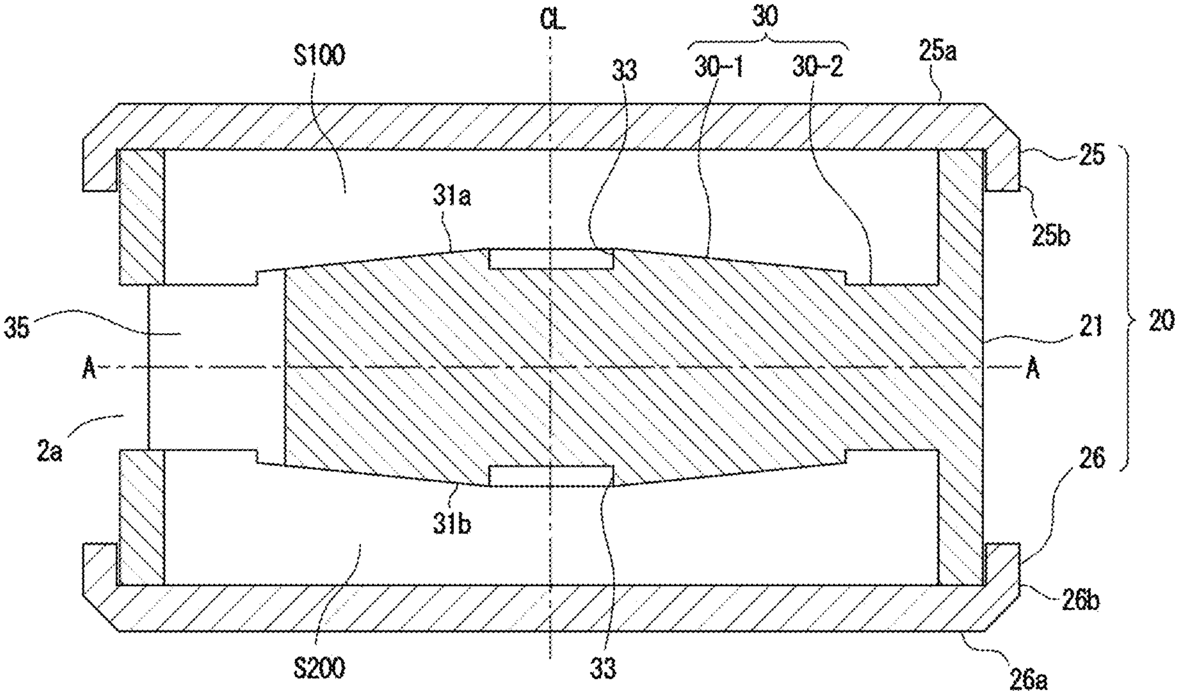
FIG. 4 is a cross-sectional view showing the housing of the electro-acoustic transducer.
Figure 5:
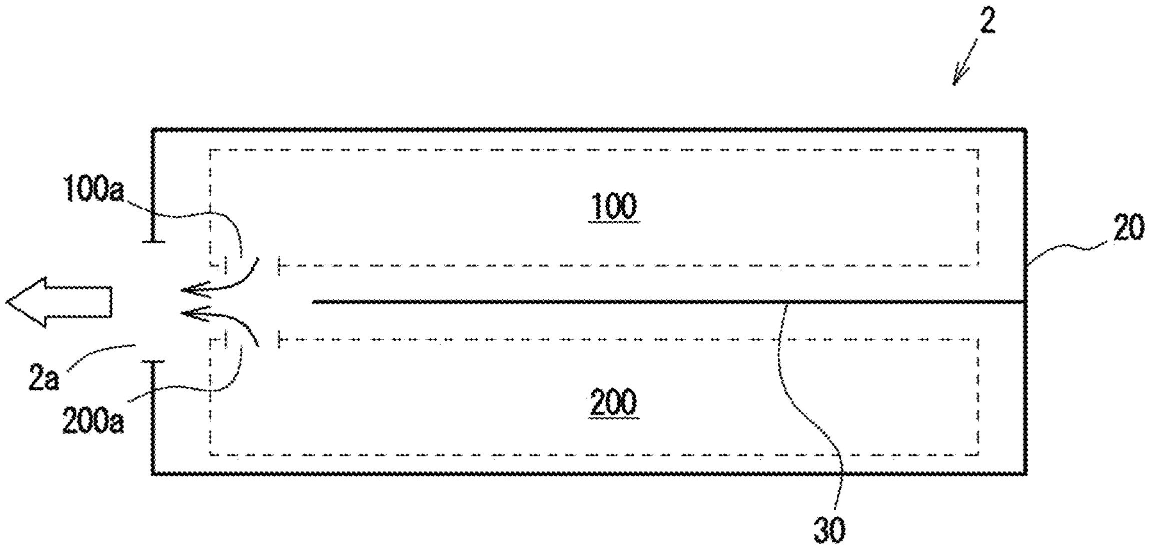
FIG. 5 is a schematic view showing a model of the structure of the electro-acoustic transducer.
Figure 6:
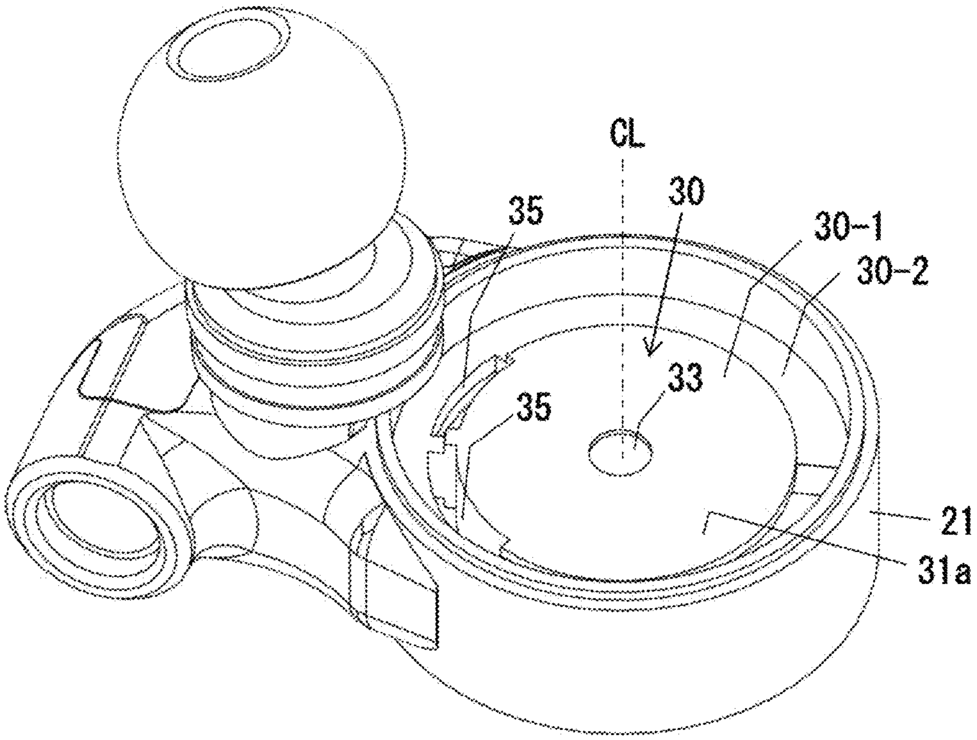
FIG. 6 is a perspective view illustrating an internal structure of the housing of the electro-acoustic transducer.
Figure 7:
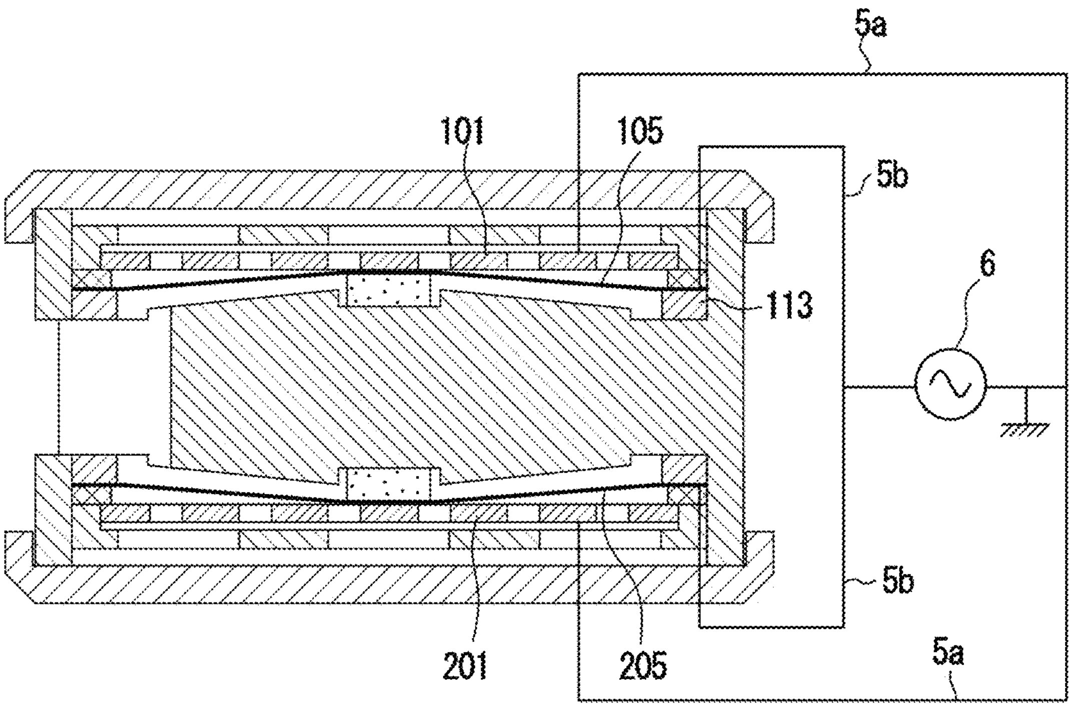
FIG. 7 is a diagram showing an electric circuit for inputting an electrical signal to a fixed electrode and a vibrating membrane.

FIG. 3 is a cross-sectional view showing the electro-acoustic transducer 2 of the earphone 1 shown in FIG. 1, and shows a cross-sectional view in the thickness direction of a housing. FIG. 4 is a cross-sectional view showing the housing of the electro-acoustic transducer 2. FIG. 5 is a schematic diagram showing the structure of the electro-acoustic transducer 2. FIG. 6 is a perspective view illustrating an internal structure of the housing of the electro-acoustic transducer 2. FIG. 7 is a diagram showing an electric circuit for inputting an electrical signal to a fixed electrode and a vibrating membrane.

As shown in FIG. 3, the electro-acoustic transducer 2 includes a housing 20, a partition member 30, a first electro-acoustic conversion unit 100, and a second electro-acoustic conversion unit 200.

One of the features of the electro-acoustic transducer 2 is that, as shown in FIGS. 3 and 5, the first electro-acoustic conversion unit 100 and the second electro-acoustic conversion unit 200 are disposed inside the housing 20, facing each other with the partition member 30 sandwiched between them. A sound generated by the first electro-acoustic conversion unit 100 and a sound generated by the second electro-acoustic conversion unit 200 are emitted to the outside from an acoustic outlet 2*a* in a side surface part of the housing 20. Since the electro-acoustic transducer 2 has such a configuration, the effective area of the vibrating membrane is larger than that of a configuration in which only one electro-acoustic conversion unit is disposed. This results in an improved sensitivity of the electro-acoustic transducer 2 even when the housing 20 is small, thereby achieving a technical effect of improving sound quality of the earphone 1.

As an example, the first electro-acoustic conversion unit 100 and the second electro-acoustic conversion unit 200 have the same configuration. The first electro-acoustic conversion unit 100 and the second electro-acoustic conversion unit 200 are disposed symmetrically with respect to a reference plane A transverse to the center part in the thickness direction of the electro-acoustic transducer 2. The components of the first electro-acoustic conversion unit 100 are numbered in the "100" series, while the components of the second electro-acoustic conversion unit 200 are numbered in the "200" series, corresponding to the components of the first electro-acoustic conversion unit 100. Hereinafter, the first electro-acoustic conversion unit 100 will be described, and redundant description of the second electro-acoustic conversion unit 200 will be omitted. The electro-acoustic conversion units 100 and 200 may be simply referred to as "electro-acoustic conversion units" without particular distinction.

Structure of the Housing

Before describing the detailed configuration of the electro-acoustic conversion unit, first, the housing 20 will be described. As shown in FIGS. 3 and 4, the housing 20 includes a housing member 21, a first cover member 25, and a second cover member 26. The housing 20 is also formed vertically symmetrically with respect to the reference plane A.

The housing member 21 is a cylindrical member. An upper end portion, which is one end portion of the housing member 21, and a lower end portion, which is the other end portion of the housing member 21, are open. The housing member 21 forms the side surface of the housing 20. The housing member 21 is formed of a resin material, for example. A first cover member 25 is attached to the upper end portion of the housing member 21, and a second cover member 26 is attached to the lower end portion of the housing member 21. The acoustic outlet 2*a* for emitting the sound to the outside is formed in the housing member 21.

The first cover member 25 closes the opening of the upper end portion of the housing member 21. As shown in FIG. 4, the first cover member 25 includes a disc-shaped flat surface 25*a* and a side surface 25*b* extending from a peripheral portion of the flat surface 25*a* in a direction perpendicular to the flat surface 25*a*. The first cover member 25 is formed of a resin material, for example.

The second cover member 26 closes the opening of the lower end portion of the housing member 21. The second cover member 26 also includes a disc-shaped flat surface 26*a* and a side surface 26*b* extending from a peripheral portion of the flat surface 26*a* in a direction perpendicular to the flat surface 26*a*. The second cover member 26 is formed of a resin material, for example.

A sealed internal space is formed by attaching the first cover member 25 and the second cover member 26 to the housing member 21. In this example, the outer shape of the housing 20 is a slightly flat cylindrical shape whose height dimension is shorter than the diameter. As can be understood from a perspective view of FIG. 2, the flat surface 25*a* of the first cover member 25 is the surface facing the user's temporal region when he/she uses the earphone 1. The cylindrical housing 20 is exemplified in the present embodiment, but the housing 20 may take any shape. One or more holes for adjusting acoustic characteristics may be formed in either or both the first cover member 25 and the second cover member 26.

Referring to FIGS. 3 and 4 again, the partition member 30 is disposed inside the housing 20. Specifically, the partition member 30 is a member that divides the internal space of the housing 20 into a first space S100 and a second space S200. The partition member 30 may be provided as a separate member from the housing member 21, but in the present embodiment, it is formed integrally with the housing member 21. The partition member 30 is a disc-shaped member, and is disposed coaxially with the housing 20 such that the central axis of the partition member 30 coincides with a central axis CL of the housing 20.

As shown in FIGS. 4 and 6, the partition member 30 has (i) a first surface 31*a* defining a part of the first space S100 and (ii) a second surface 31*b* located on the opposite side of the first surface 31*a* and defining a part of the second space S200. The first surface 31*a* and the second surface 31*b* may be inclined surfaces with respect to the reference plane A, or may be surfaces parallel to the reference plane A.

Specifically, the partition member 30 includes a circular thick part 30-1 and an annular part 30-2 formed outside the thick part 30-1. The thick part 30-1 is formed in a circular region of a predetermined radius centered on the central axis CL. The annular part 30-2 has an annular flat surface. As described later, a conductive member 113 and the like are disposed in the annular part 30-2.

The partition member 30 includes a concave part 33 which is a first concave part formed in the first surface 31*a*. Further, the partition member 30 includes the concave part 33 formed in the second surface 31*b* (see FIG. 3). Each concave part 33 is a structural portion for receiving a support member 107 and supporting the support member 107. The concave part 33 has a flat bottom surface and a circular outer shape that is slightly larger than the cross-sectional shape of the support member 107. The concave part 33 has an inner diameter larger than the diameter of the support member 107, as an example. The concave part 33 is formed in the center part of the partition member 30

According to the configuration where the concave part 33 that receives the support member 107 is formed in this manner, the support member 107 is disposed in the concave part 33, which is a predetermined fixed position, during product assembly. Therefore, the position of the support member 107 hardly varies. Therefore, it is possible to reduce variation in acoustic characteristics of the electro-acoustic transducer 2 caused by displacement of the support member 107. It should be noted that the partition member 30 supports a support member 207 of the second electro-acoustic conversion unit 200 in the concave part 33, which is a second concave part formed in the second surface 31*b*.

As shown in FIG. 6, the partition member 30 has through-holes 35 penetrating the partition member 30 in the thickness direction. An opening of each through-hole 35 is exposed in the first space S100, and the other opening of the through-hole 35 is exposed in the second space S200. In this way, the first space S100 and the second space S200 communicate with each other. The one opening of the through-hole 35 exposed in the first space S100 forms a sound emitting part 100*a* of the first electro-acoustic conversion unit 100 (see FIG. 3). The other opening exposed in the second space S200 forms a sound emitting part 200*a* of the second electro-acoustic conversion unit 200.

Although the configuration in which the partition member 30 divides the internal space of the housing 20 has been described above, the partition member 30 need not necessarily have a function of dividing the internal space of the housing 20.

The through-hole 35 is a hole extending straight along the thickness direction of the partition member 30, for example. When the through-hole 35 has such a shape, there is an advantage that the through-hole 35 can be easily formed with a mold. The outer shape of the through-hole 35 may be any shape, however, and as an example shown in FIG. 6, the through-hole 35 may have an arc shape or a curved shape. A plurality of through-holes 35 may be formed, or only one through-hole 35 may be formed.

Electro-Acoustic Conversion Unit

Next, the electro-acoustic conversion unit will be described. As described above, the first electro-acoustic conversion unit 100 and the second electro-acoustic conversion unit 200 have the same configuration and are disposed symmetrically with the reference plane A in between. Therefore, among two electro-acoustic conversion units, the first electro-acoustic conversion unit 100 will be described below.

As shown in FIG. 3, the first electro-acoustic conversion unit 100 includes a fixed electrode 101, a fixed electrode cover 103, a vibrating membrane 105, the support member 107, an insulating member 111, and the conductive member 113.

The fixed electrode 101 is formed of a plate-shaped conductive member. The shape and size of the fixed electrode 101 are arbitrary, and the fixed electrode 101 has, for example, a disc shape. The fixed electrode 101 has a plurality of holes through which air passes.

An electret layer (not shown) is formed on a surface of the fixed electrode 101 facing the vibrating membrane 105. The electret layer includes a dielectric that semi-permanently retains the charge, and applies a bias voltage to the conductive member of the fixed electrode 101. Since the first electro-acoustic conversion unit 100 has the fixed electrode 101 formed with the electret layer, there is no need to apply a bias voltage to the fixed electrode 101 from the outside. If an electret layer is not formed on the fixed electrode 101, a bias voltage may be applied to the fixed electrode 101 through a terminal (not shown).

As schematically shown in FIG. 7, the fixed electrode 101 is connected to the ground of a sound source 6 through a wiring 5*a*. In the second electro-acoustic conversion unit 200, a fixed electrode 201 is also connected to the ground of the sound source 6 through the wiring 5*a*.

The fixed electrode cover 103 is a member for fixing the fixed electrode 101, and is disposed between the fixed electrode 101 and the first cover member 25. The fixed electrode cover 103 is a substantially disc-shaped member having a plurality of holes formed therein, and is formed of an insulating member. The plurality of holes formed in the fixed electrode cover 103 are holes for allowing air to pass through. An acoustic chamber is formed by the housing 20 and the like on the back side of the fixed electrode cover 103 (that is, on the opposite side of the surface facing the vibrating membrane 105). In such a configuration, the plurality of holes formed in the fixed electrode cover 103 are one element for determining acoustic impedance, and the shape and size of the holes are used for acoustic design of the electro-acoustic conversion unit 100.

The vibrating membrane 105 is a thin film having conductivity and faces the fixed electrode 101. The vibrating membrane 105 is formed of, for example, a metal foil or a polymer film on which gold is vapor-deposited. The vibrating membrane 105 is circular, for example. An annular region of an outer peripheral part of the vibrating membrane 105 is supported by the insulating member 111 and the conductive member 113, for example.

A partial region of the vibrating membrane 105 is pressed against the fixed electrode 101 by the support member 107. Specifically, a region of the center part of the circular vibrating membrane 105 is pressed against the fixed electrode 101, and is in contact with the center part of the fixed electrode 101. Due to such a configuration, the vibrating membrane 105 is configured such that a distance between the vibrating membrane 105 and the fixed electrode 101 in the thickness direction of the fixed electrode 101 gradually becomes longer, as the distance from the partial region, where the vibrating membrane 105 is in contact with the fixed electrode 101, to the outer side (radially outer side of the circular vibrating membrane 105) increases. The outer peripheral part of the vibrating membrane 105 is most distant from the fixed electrode 101. Specifically, the vibrating membrane 105 and the fixed electrode 101 are separated from each other by the thickness of the insulating member 111, for example.

It should be noted that although the center part of the vibrating membrane 105 physically contacts the fixed electrode 101, the vibrating membrane 105 and the fixed electrode 101 are not electrically connected. The structure in which the vibrating membrane 105 and the fixed electrode 101 are not electrically connected may be the one described below. Specifically, the vibrating membrane 105 may be formed of a film material having insulation properties, and a metal film need not be formed on its surface facing the fixed electrode 101 but may be formed only on its surface on the opposite side of the surface facing the fixed electrode 101. With such a configuration, even when the center part of the vibrating membrane 105 contacts the fixed electrode 101, the vibrating membrane 105 and the fixed electrode 101 will not be electrically connected.

The support member 107 is formed of a spring, a porous body, or an elastic material such as rubber. The shape of the support member 107 may be any shape, and it has, for example, a columnar shape. As an example, the support member 107 has a flat upper surface and a flat lower surface. The support member 107 may be a cube. The support member 107 is disposed in the concave part 33 of the partition member 30, and protrudes from the concave part 33 by a predetermined height. The support member 107 is displaced in a direction in which the vibrating membrane 105 is displaced in response to a change in pressure in an acoustic space of the first electro-acoustic conversion unit 100. The change in pressure in the acoustic space occurs when the earphone 1 is worn in the ear or when the earphone 1 is removed from the ear, for example.

The insulating member 111 prevents the vibrating membrane 105 from conducting to the fixed electrode 101. The insulating member 111 is an annular member having a predetermined thickness, and is formed of a resin, for example. The insulating member 111 is disposed between the vibrating membrane 105 and the fixed electrode 101.

The conductive member 113 is a conductive member for applying an electrical signal to the vibrating membrane 105. The conductive member 113 has an annular shape, for example, and is formed of a conductive sheet. The conductive member 113 is disposed on a surface of the vibrating membrane 105 opposite to the surface that contacts the insulating member 111, and contacts the outer peripheral part of the vibrating membrane 105. In other words, the conductive member 113 and the insulating member 111 sandwich the outer peripheral part of the vibrating membrane 105. As shown in FIG. 7, an electrical signal from the sound source 6 is input to the conductive member 113 via the wiring 5*b*. The conductive member 113 may be a metallic member, instead of the conductive sheet. Any material may be used, and for example, brass may be used.

The first electro-acoustic conversion unit 100 has been described above. The second electro-acoustic conversion unit 200 is configured similarly to the first electro-acoustic conversion unit 100. As shown in FIG. 3, the second electro-acoustic conversion unit 200 includes the fixed electrode 201, a fixed electrode cover 203, a vibrating membrane 205, the support member 207, an insulating member 211, and a conductive member 213. The fixed electrode 201, the fixed electrode cover 203, the vibrating membrane 205, the support member 207, the insulating member 211, and the conductive member 213 correspond to the fixed electrode 101, the fixed electrode cover 103, the vibrating membrane 105, the support member 107, the insulating member 111, and the conductive member 113 of the first electro-acoustic conversion unit 100, respectively, and therefore redundant description thereof is omitted.

As shown in FIGS. 3 and 5, the first electro-acoustic conversion unit 100 and the second electro-acoustic conversion unit 200 are disposed facing each other so that the sound emitting part 100*a* of the first electro-acoustic conversion unit 100 and the sound emitting part 200*a* of the second electro-acoustic conversion unit 200 face each other. Specifically, the first electro-acoustic conversion unit 100 and the second electro-acoustic conversion unit 200 are disposed parallel to each other so that the fixed electrode 101 and the fixed electrode 201 are parallel to each other, for example.

In the first electro-acoustic conversion unit 100 configured as described above, the vibrating membrane 105 vibrates in the acoustic space of the first electro-acoustic conversion unit 100 in accordance with a potential difference generated between the fixed electrode 101 and the vibrating membrane 105, on the basis of the electrical signal input from the sound source 6. Similarly, in the second electro-acoustic conversion unit 200, the vibrating membrane 205 vibrates in an acoustic space of the second electro-acoustic conversion unit 200 in accordance with a potential difference generated between the fixed electrode 201 and the vibrating membrane 205. The sound generated by the first electro-acoustic conversion unit 100 and the sound generated by the second electro-acoustic conversion unit 200 are emitted from the sound emitting units 100*a* and 200*a*, respectively. The sound generated by the first electro-acoustic conversion unit 100 and the sound generated by the second electro-acoustic conversion unit 200 are emitted to the outside of the housing 20 from the acoustic outlet 2*a* in the side surface of the housing 20, and are emitted to the outside of the earphone 1, via the conduit part 4*a* and the earpiece 3.

Technical Effect of the Configuration of the First Embodiment

As described above, in the electro-acoustic transducer 2 of the present embodiment, a pair of electro-acoustic conversion units, consisting of the first electro-acoustic conversion unit 100 and the second electro-acoustic conversion unit 200, are disposed in the housing 20. Therefore, compared to an electro-acoustic transducer provided with only one electro-acoustic conversion unit, the effective area of the vibrating membrane is doubled, resulting in the improved sensitivity of the electro-acoustic transducer 2. According to the configuration of the present embodiment, the sensitivity of the electro-acoustic transducer 2 can be improved, even when the electro-acoustic transducer 2 is small and it is difficult to ensure sufficient sensitivity with one electro-acoustic conversion unit.

In particular, in the electro-acoustic transducer 2 of the present embodiment, a part of the vibrating membrane 105 of the first electro-acoustic conversion unit 100 is pressed against the fixed electrode 101, and a part of the vibrating membrane 205 of the second electro-acoustic conversion unit 200 is pressed against the fixed electrode 201. In such a configuration, a gap between the fixed electrode 101 and the vibrating membrane 105 and a gap between the fixed electrode 201 and the vibrating membrane 205 are reduced in the condenser type driver unit, and this improves the sensitivity of the electro-acoustic transducer 2.

In the case of the configuration in which the vibrating membrane is fixed to the housing only at the outer peripheral part of the vibrating membrane, when the inside of the electro-acoustic transducer changes, stress is concentrated on the outer peripheral part of the vibrating membrane due to displacement of the vibrating membrane. On the other hand, in the first electro-acoustic conversion unit 100 and the second electro-acoustic conversion unit 200 of the present embodiment, displacement of the vibrating membrane 105 and the vibrating membrane 205 is suppressed by the support member 107. Therefore, the concentration of stress in the outer peripheral parts of the vibrating membrane 105 and the vibrating membrane 205 is alleviated. Therefore, the possibility that the vibrating membranes 105 and 205 will be damaged is reduced. Further, in the configuration of the present embodiment, a degree of displacement of the vibrating membrane is smaller compared to the configuration where the fixed electrode and the vibrating membrane are disposed in parallel, and therefore it is possible to reduce the thickness of each of the first electro-acoustic conversion unit 100 and the second electro-acoustic conversion unit 200, which is advantageous for downsizing the overall earphone 1.

The first space S100 in which the first electro-acoustic conversion unit 100 is disposed and the second space S200 in which the second electro-acoustic conversion unit 200 is disposed do not need to be independent from each other and may be formed as a common air chamber. However, when the first space S100 and the second space S200 are independent from each other as in the present embodiment, there is an advantage in that acoustic design of each acoustic electro-acoustic conversion unit is easy.

In the electro-acoustic transducer 2 of the present embodiment, the fixed electrode 101 and the fixed electrode 201 preferably have an electret layer. In the case of a configuration in which two so-called dynamic driver units that use magnets, are facing each other, the influence of repulsion due to magnetism occurs. However, in the configuration where the electro-acoustic transducers 2, having the electret condenser type electro-acoustic conversion units, face each other, as in the present embodiment, the elements that affect sound quality, such as repulsion, are reduced.

Figure 8:
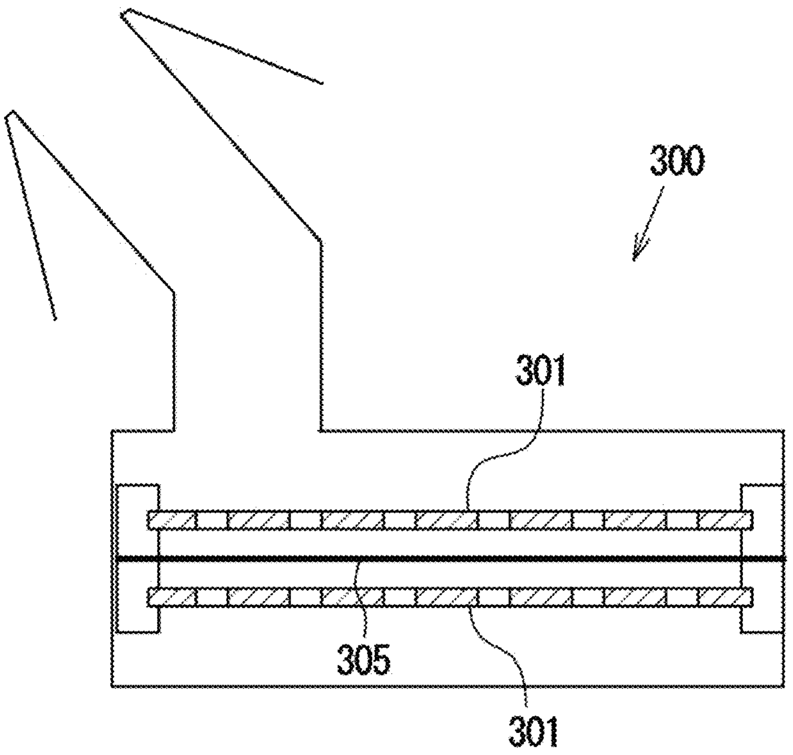
FIG. 8 is a cross-sectional view schematically showing a push-pull electro-acoustic transducer.

FIG. 8 is a cross-sectional view schematically showing a push-pull electrostatic electro-acoustic transducer as a comparative example. In a push-pull electro-acoustic transducer 300 shown in FIG. 8, a pair of fixed electrodes 301 are disposed on respective sides of a vibrating membrane 305. In the push-pull electro-acoustic transducer 300, a balanced drive amplifier (not shown) is required to operate the electro-acoustic transducer 300. In the configuration of the present embodiment, both single-end drive and balanced drive can be used.

Further, in the push-pull electro-acoustic transducer 300, there is a case where it is difficult to improve sensitivity of the electro-acoustic transducer 300 in which each fixed electrode 301 forms an acoustic impedance. In order to prevent the vibrating membrane 305 from sticking to the fixed electrode 301, a gap between the vibrating membrane 305 and the fixed electrode 301 needs to be relatively large. Such a configuration is disadvantageous for improving the sensitivity and downsizing the electro-acoustic transducer 300. In contrast, the configuration of the electro-acoustic transducer 2 of the present embodiment is advantageous for improving the sensitivity and downsizing the electro-acoustic transducer 2.

In the electro-acoustic transducer 2 of the present embodiment, the partition member 30 has the first surface 31*a* defining a part of the acoustic space of the first electro-acoustic conversion unit 100 and the second surface 31*b* defining a part of the acoustic space of the second electro-acoustic conversion unit 200. With such a configuration, the partition member 30 that partitions the interior of the housing 20 into two spaces also serves as a member that forms the acoustic space of the first electro-acoustic conversion unit 100 and the acoustic space of the second electro-acoustic conversion unit 200. Therefore, the number of components is reduced and the structure is simplified as compared with a configuration in which the acoustic space of each of the electro-acoustic conversion units 100 and 200 is formed by a member different from the partition member 30. In addition, according to the configuration of the present embodiment in which the partition member 30 defines a part of the acoustic space, there is an advantage in that acoustic resistance can be easily adjusted. Further, according to the configuration of the present embodiment, it is easy to change parameters such as an acoustic mass, acoustic capacity, and acoustic resistance for controlling vibrations of the vibrating membrane 105.

In the electro-acoustic transducer 2 of the present embodiment, the concave part 33 for receiving and supporting the support member 107 is formed in each of the first surface 31*a* and the second surface 31*b* of the partition member 30. According to this configuration, the support member 107 is disposed in the concave part 33, and the position of the support member 107 is less likely to be displaced. Therefore, variation in acoustic characteristics caused by displacement of the support member 107 is reduced.

In the electro-acoustic transducer 2 of the present embodiment, the partition member 30 is a plate-shaped member, and the partition member 30 is formed with the through-hole 35 in which one opening is exposed in the first space S100 and the other opening is exposed in the second space S200. With such a configuration, the acoustic space of the first electro-acoustic conversion unit 100 and the acoustic space of the second electro-acoustic conversion unit 200 can communicate with each other by a simple structure in which the through-hole 35 is formed in the plate-shaped partition member 30.

In the electro-acoustic transducer 2 of the present embodiment, the acoustic outlet 2*a* for emitting the sound from the housing 20 to the outside is formed on the side surface of the housing 20, instead of the first cover member 25 and the second cover member 26 of the housing 20. With such a configuration, the design of the earphone 1 can be tailored to fit the shape of the user's ear and its surroundings, as compared to the configuration where an acoustic outlet is provided on the first cover member 25 and the second cover member 26. Therefore, the earphone 1 becomes user-friendly.

In the electro-acoustic transducer 2 of the present embodiment, the housing 20 includes the cylindrical housing member 21. The first cover member 25 is attached to one end portion of the housing member 21, and the second cover member 26 is attached to the other end portion of the housing member 21. With such a configuration, during product assembly, an operator places the first electro-acoustic conversion unit 100 inside the housing 20 from the one end portion of the housing 20 and attaches the first cover member 25. Subsequently, the operator places the second electro-acoustic conversion unit 200 inside the housing 20 from the other end portion of the housing 20, and attaches the second cover member 26. With such steps, the operator can easily assemble the electro-acoustic transducer 2.

Second Embodiment

Figure 9:
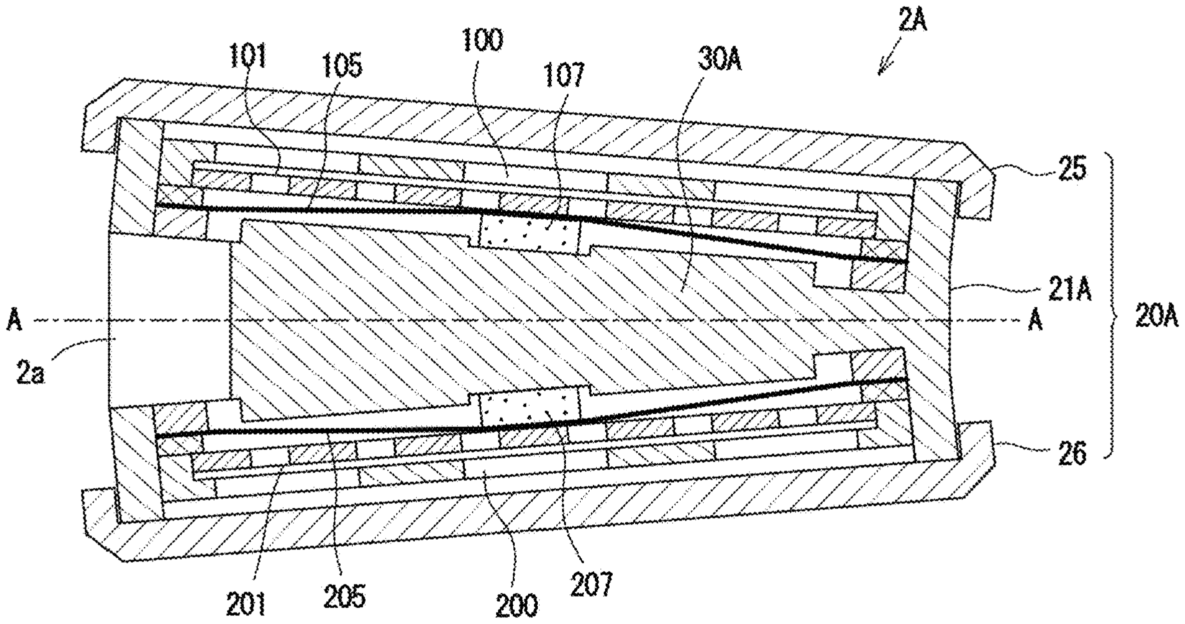
FIG. 9 is a cross-sectional view illustrating a configuration of an electro-acoustic transducer according to a second embodiment.
Figure 10:
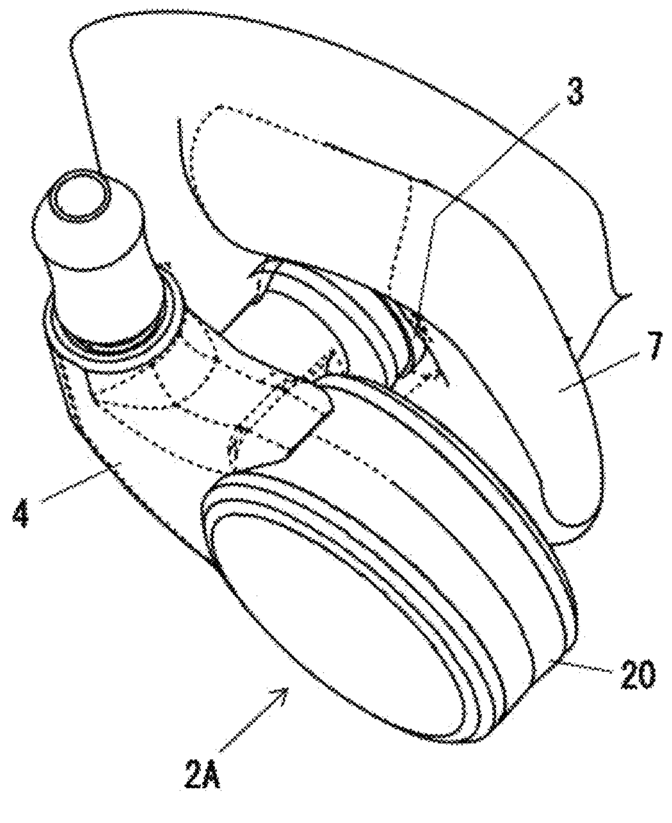
FIG. 10 is a perspective view showing a state where an earphone having the electro-acoustic transducer according to the second embodiment is worn by a user.

In the first embodiment, the first electro-acoustic conversion unit 100 and the second electro-acoustic conversion unit 200 are arranged in parallel. In one aspect of the present invention, the first electro-acoustic conversion unit 100 and the second electro-acoustic conversion unit 200 may be arranged as shown in FIG. 9. FIG. 9 is a cross-sectional view showing a configuration of an electro-acoustic transducer of the second embodiment. FIG. 10 is a perspective view showing a state where an earphone having the electro-acoustic transducer according to the second embodiment is worn by a user.

An electro-acoustic transducer 2A shown in FIG. 9 includes a housing 20A, a partition member 30A, the first electro-acoustic conversion unit 100, and the second electro-acoustic conversion unit 200. The housing 20A includes a housing member 21A having a shape different from that of the housing member 21 of the first embodiment, a first cover member 25 attached to one end portion of the housing member 21A, and a second cover member 26 attached to the other end portion of the housing member 21A.

The partition member 30A is formed in a shape such that its plate thickness gradually decreases from an end portion, which is close to the earpiece 3 where the acoustic outlet 2*a* is located, of the housing 20A (end portion on the left side in FIG. 9) toward an end portion (end portion on the right side in the drawing) that opposes the acoustic outlet 2*a*. In accordance with this, the housing 20A is formed such that a thickness of the housing 20A at the end portion that opposes the acoustic outlet 2*a* is less than a thickness at the end portion on the acoustic outlet 2*a* side. Specifically, as an example, the housing 20A is formed such that the thickness gradually decreases from the end portion where the acoustic outlet 2*a* is located to the end portion that opposes the acoustic outlet 2*a*. Although the thickness of the housing 20A continuously decreases in the example of FIG. 9, the configuration where "the thickness gradually decreases" may partially include a region in which the thickness is constant.

As an example, similarly to the first embodiment, the first electro-acoustic conversion unit 100 and the second electro-acoustic conversion unit 200 are provided in a symmetrical arrangement facing each other across the reference plane A. The first electro-acoustic conversion unit 100 and the second electro-acoustic conversion unit 200 are disposed with an inclination such that a distance between them gradually decreases from the end portion where the acoustic outlet 2*a* is located toward the opposite end portion. Since other configurations of the electro-acoustic transducer 2A are similar to those of the first embodiment, redundant description thereof will be omitted.

According to the configuration of the second embodiment, compared to the configuration where the first electro-acoustic conversion unit 100 and the second electro-acoustic conversion unit 200 are disposed in parallel, the housing 20A is formed to be thin particularly in a region that opposes the side where the acoustic outlet 2*a* is located. This region is closer to the helix 7 (see FIG. 10) of the user's pinna, within the housing 20A. Therefore, the electro-acoustic transducer 2A of the second embodiment can avoid interference between the housing 20A and the ear, thereby improving the wearability of the earphone 1.

In the electro-acoustic transducer 2A of the second embodiment, similarly to the first embodiment, the first electro-acoustic conversion unit 100 and the second electro-acoustic conversion unit 200 are disposed facing each other in the housing 20A. Therefore, it is possible to obtain an effect of improving sensitivity of the electro-acoustic transducer 2A.

The present disclosure is explained based on the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

What is claimed is:

1. An electro-acoustic transducer comprising:

a housing that includes an acoustic outlet for emitting a sound to the outside;

a partition member disposed inside the housing;

a first electro-acoustic conversion unit disposed inside the housing; and a second electro-acoustic conversion unit disposed inside the housing, wherein the first electro-acoustic conversion unit and the second electro-acoustic conversion unit each include:

a fixed electrode;

a vibrating membrane which is disposed opposite to the fixed electrode and vibrates in accordance with a potential difference generated between the fixed electrode and the vibrating membrane, on the basis of an electrical signal; and a support member that supports a partial region of the vibrating membrane and brings a part of the vibrating membrane into contact with the fixed electrode, wherein a distance between the vibrating membrane and the fixed electrode in a thickness direction of the fixed electrode becomes longer as the distance from the partial region to an outer side increases, wherein the first electro-acoustic conversion unit and the second electro-acoustic conversion unit are disposed facing each other across the partition member so that a sound emitting part of the first electro-acoustic conversion unit and a sound emitting part of the second electro-acoustic conversion unit communicate with the acoustic outlet, and the partition member supports the support member of the first electro-acoustic conversion unit and the support member of the second electro-acoustic conversion unit.

2. The electro-acoustic transducer according to claim 1, wherein the partition member includes:

a first concave part, formed on a first surface defining a part of an acoustic space of the first electro-acoustic conversion unit, that receives and supports the support member of the first electro-acoustic conversion unit; and a second concave part, formed on a second surface defining a part of an acoustic space of the second electro-acoustic conversion unit, that receives and supports the support member of the second electro-acoustic conversion unit.

3. The electro-acoustic transducer according to claim 1, wherein the partition member is configured to divide an interior of the housing into a first space and a second space.

4. The electro-acoustic transducer according to claim 3, wherein the partition member is a plate-shaped member, and is formed with a through-hole in which one opening is exposed in the first space and the other opening is exposed in the second space.

5. The electro-acoustic transducer according to claim 4, wherein the through-hole is formed to extend in a plate thickness direction of the partition member.

6. The electro-acoustic transducer according to claim 1, wherein the housing is cylindrical, and the acoustic outlet is formed in a side surface part of the housing.

7. The electro-acoustic transducer according to claim 6, wherein the first electro-acoustic conversion unit and the second electro-acoustic conversion unit are disposed with an inclination such that, in a cross-sectional view in a thickness direction of the housing, a distance between the first electro-acoustic conversion unit and the second electro-acoustic conversion unit gradually decreases from an end portion, where the acoustic outlet is located in the housing, to the end portion that opposes the acoustic outlet.

8. The electro-acoustic transducer according to claim 7, wherein a thickness of the housing at the end portion that opposes the acoustic outlet is less than a thickness of the housing at the end portion on the acoustic outlet side.

9. The electro-acoustic transducer according to claim 1, wherein the housing includes:

a cylindrical housing member;

a first cover member attached to one end portion of the housing member; and a second cover member attached to the other end portion of the housing member.

* * * * *